Patented Apr. 7, 1953

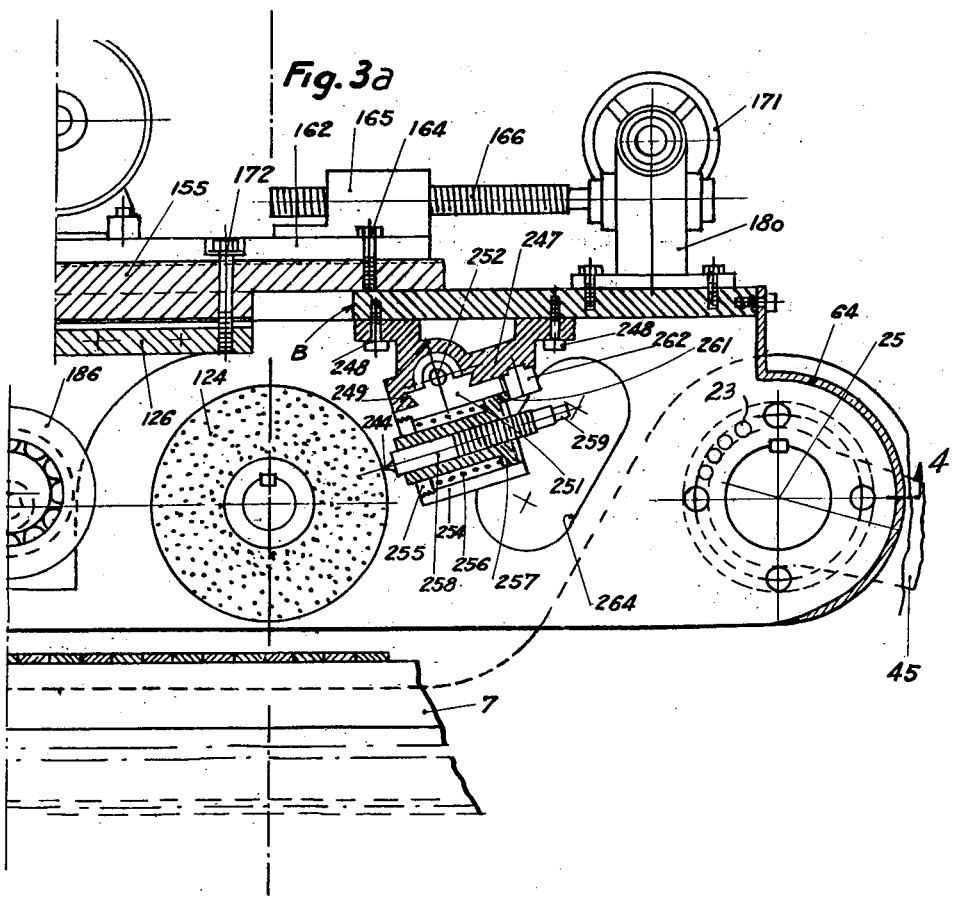

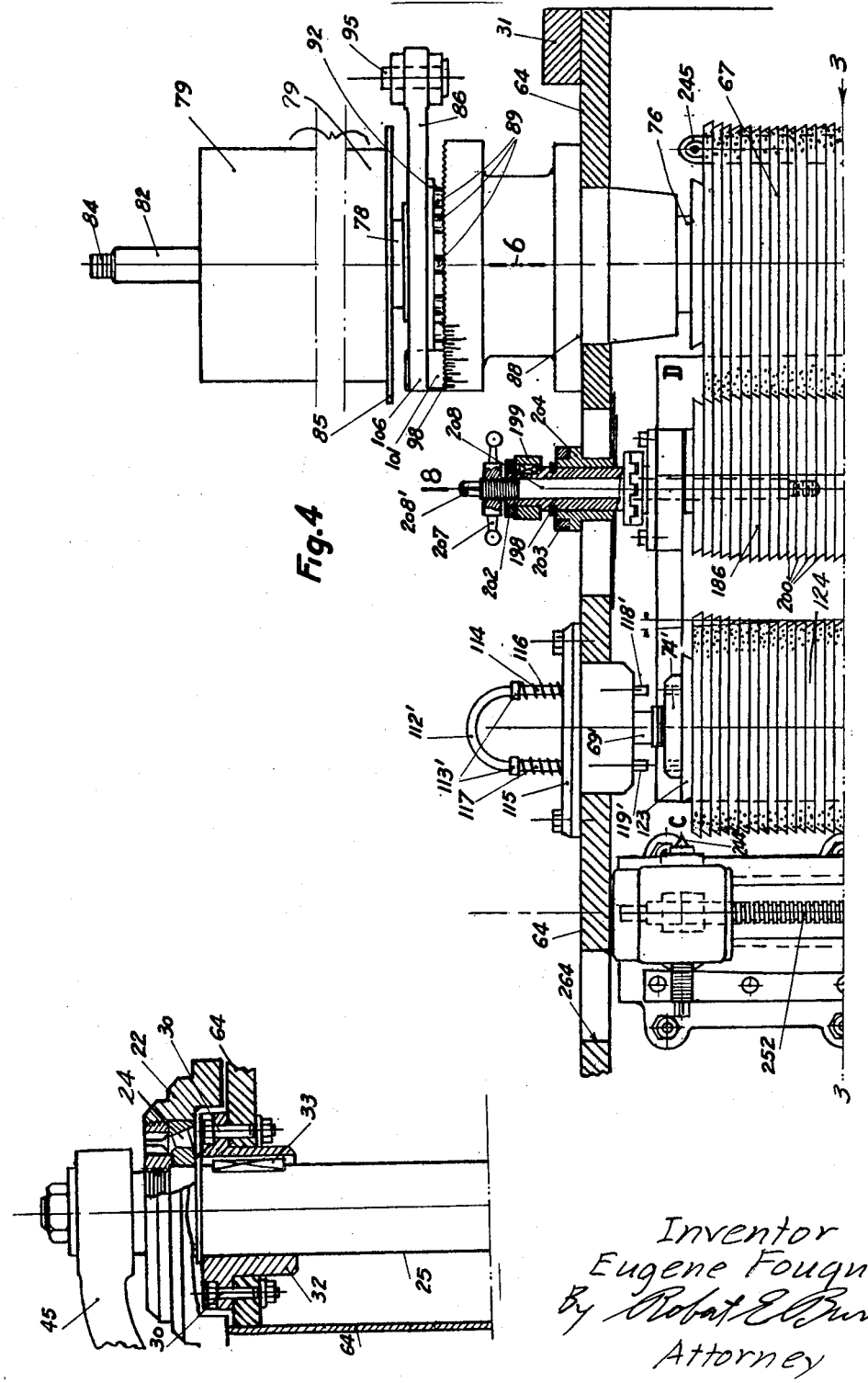

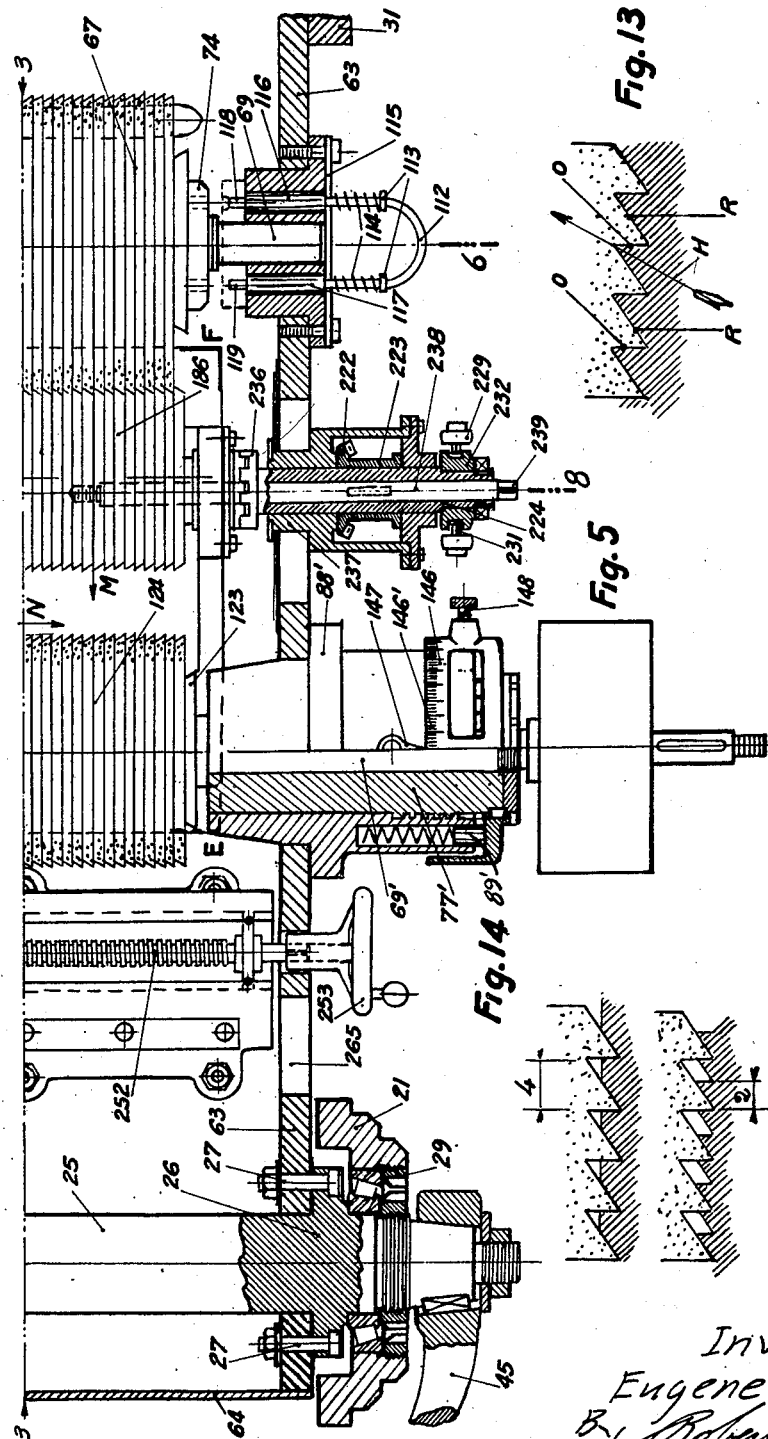

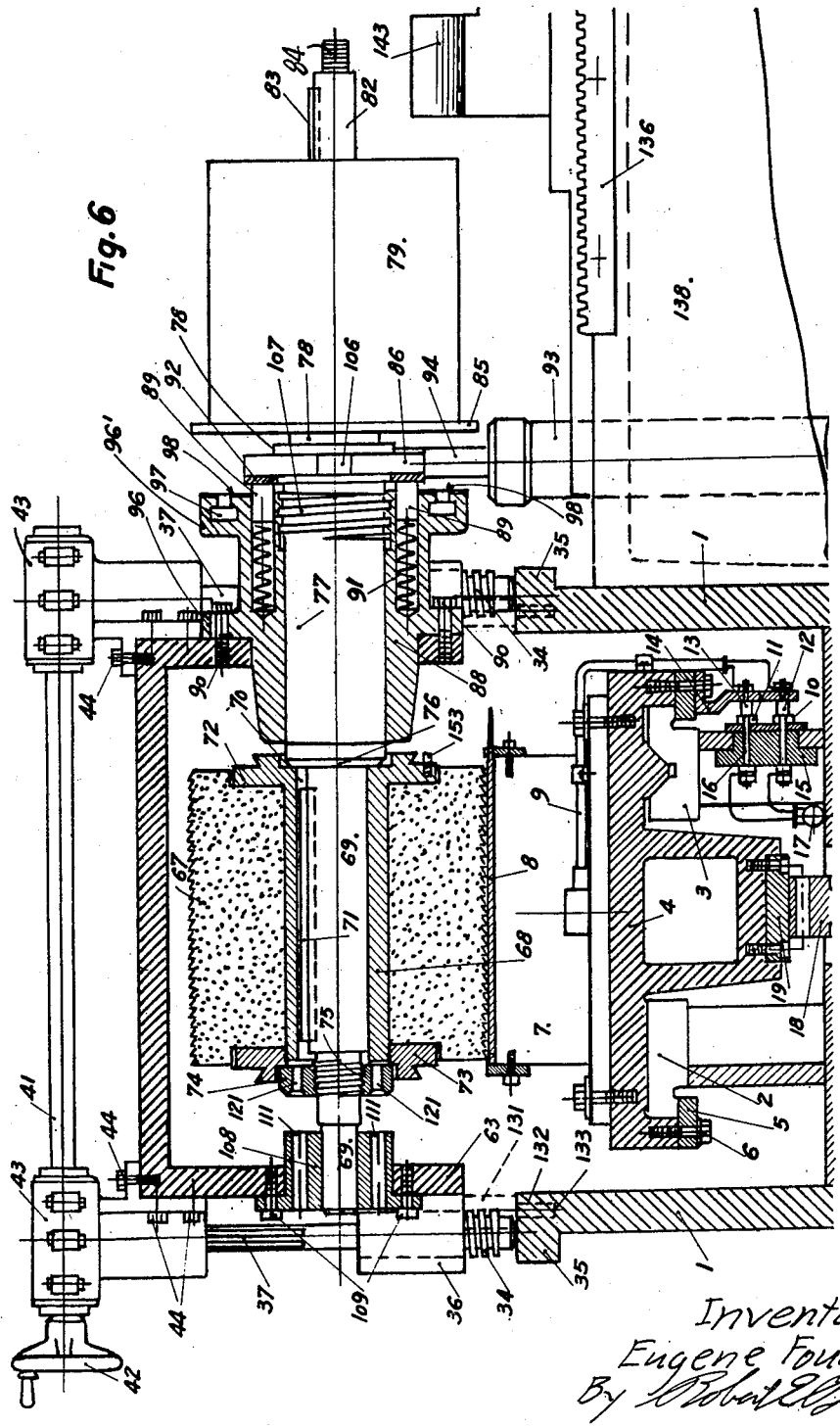

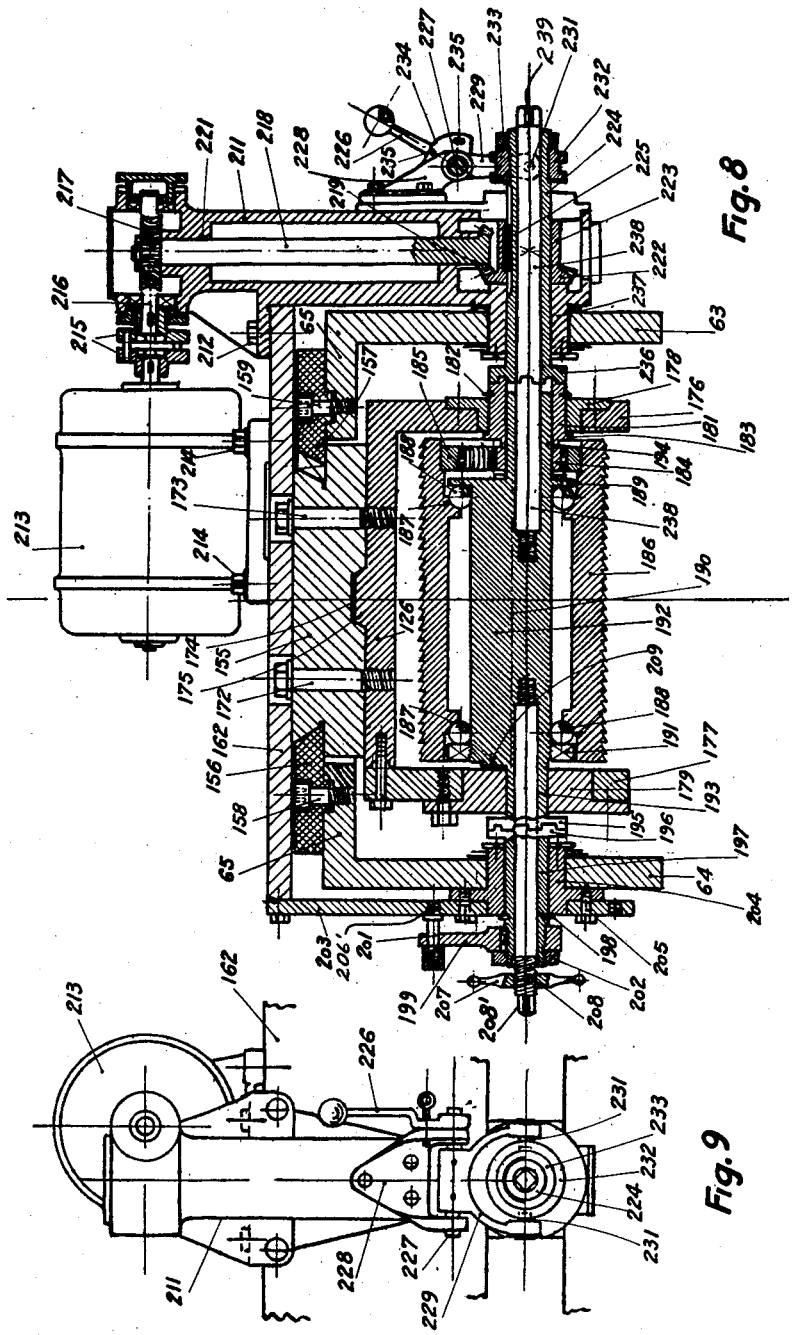

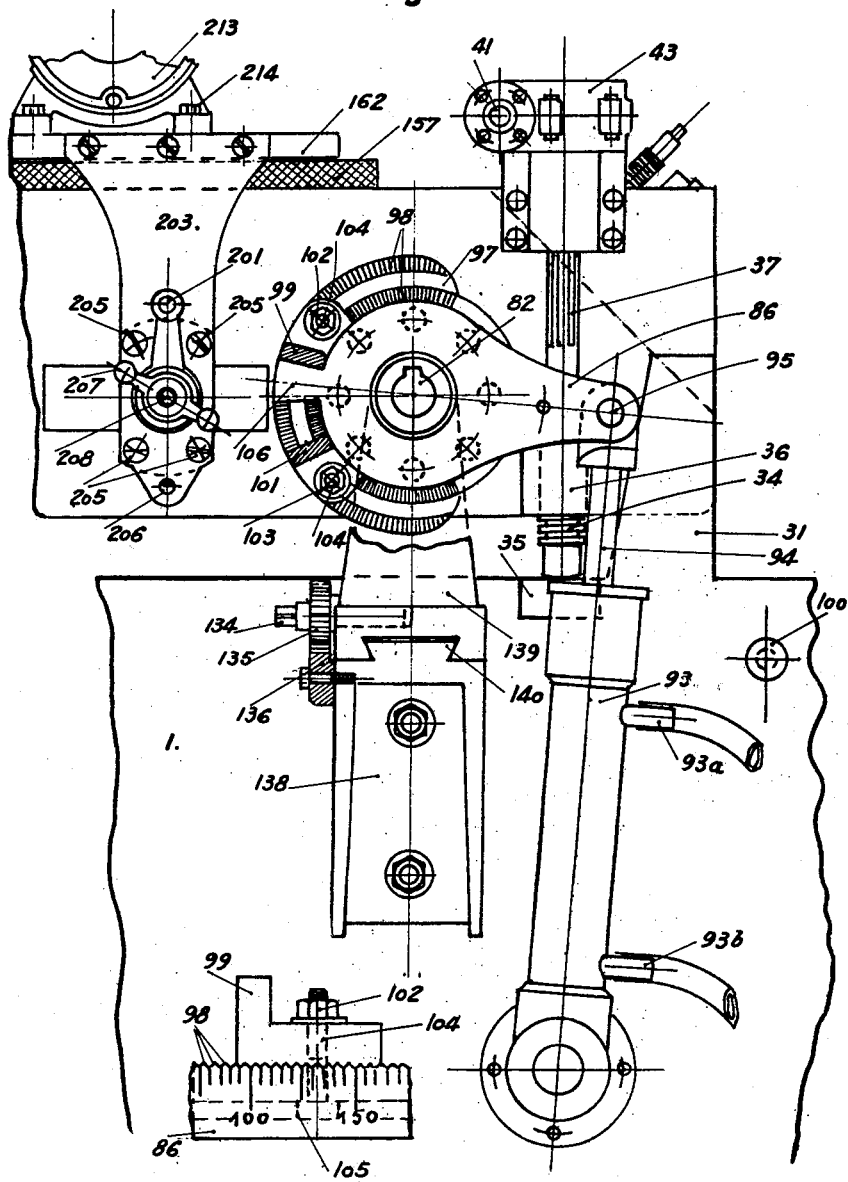

2,633,674

UNITED STATES PATENT OFFICE 2,633,674

MACHINE FOR CUTTING FILES

Eugène Fouquet, Bois-Colombes, France

Application December 16, 1949, Serial No. 133,245
In France September 5, 1949

8 Claims. (Cl. 51—5)

It is known to cut files by grinding a hardened blank.

The applicant has already worked out machines in which such cutting is made not only in such a way, but at a rate much more rapid than as previously, by operating at supraconductive speeds of machining. At such speeds, with the files supported on a carriage travelling under the grinder at a lineal speed exceeding one meter per second, and with the grinder rotating with very high speed, the heat of chips cannot be transmitted to the work piece in point. The latter would, on the contrary, heat up if its alternating speed and the rotation of the grinder were decreased. In particular, this feature defines the term "supraconductive speed."

Such machines are, of course, to be properly conditioned, and means for cutting the grinder, placed in the machine, and maintaining its profile by a crusher, carried by the machine, are necessary. It is also necessary to mount up on the machine a profiled grinder for the purpose of rectifying the crusher whenever necessary.

All grinders and crushers have hitherto been mounted cantilever fashion, at the ends of spindles supported by carriages slidable with respect to one another and on a supporting structure generally disposed vertically. With such mounting, the change of the grinders and crushers would have been easy if it were not for the weight of these tools which became, for the tools of sufficient length and diameter, such as to render precarious the various operations. The overhang also limited, apart from the question of weight, the length of grinders, hence the length of cut files.

In the grinding machine according to the present invention the various novel arrangements permit of utilizing heavy grinders of large dimensions, without overhang, easily removable and replaceable, as well as formation crushers, without risking to warp any constituent part and without possibility of false maneuvering.

To this end, the grinding machine, of the type known as to the horizontal displacement of files assembled on a carriage movable under the grinder, is equipped with the grinder supporting cage adapted to pivot on a horizontal axle and carrying, between two bearings for each tool spindle, a working grinder, automatically displaceable in the direction of its spindle, intended for sharpening or cutting the teeth of the files under treatment; a cutting and maintenance crusher adapted to operate while being free to move axially; a maintenance grinder for said crusher, which grinder may be displaced axially; and various other heavy parts associated with said grinders and crushers; hydraulic lifting and supporting devices for all said parts; abutment and slow-motion devices for setting in working position the respective parts; means for immobilizing, in dismantling position, said supporting cage which, for dismantling operation, may be set in a position indexed on certain parts to permit of withdrawing and setting in place the respective parts, with great accuracy and without false maneuvering; the grinding tools supporting spindles, forcibly long and heavy, equipped with parts remaining thereon when the parts to be removed or set in place are caused to take the predetermined positions, with their locking means conveniently oriented, with respect to a cradle in turn taking its exact position under the hydraulically operated grinder carrying cage which puts in place the parts to be dismantled when it moves down onto the cradle whose special abutments then stop this downward motion. The grinder and crushers to be mounted are also caused to take the predetermined positions, and the cage, when lifted permits them to be set in place with facility in the housings managed, for this purpose, on the cradle, like in the case of dismantling.

Of course, both the grinders and crushers are, on the pivoting cage, displaceable either by hand or automatically, and provisions are made for adjusting wear of these tools, due to the machining of the parts and to the maintenance of the exact profile of the working grinder and its crusher, and manually or automatically correcting the downward motion of the working grinder onto the work pieces under treatment, by means of adjustable parts limiting this downward motion.

The assembly of said grinders, crushers and other parts, which is mounted to pivot on an axle, has for its main purpose to facilitate the mounting and dismantling of heavy parts, namely by utilizing their weight for blocking them in their working positions, for example with the aid of hydraulic jacks.

The invention will be more clearly understood by referring to the accompanying drawings which show, by way of example, some embodiments thereof and in which:

Fig. 3a is a similar view of the other half of the machine as shown in Fig. 3;

Fig. 4 is a half-sectional view taken through the line 4—4 of Fig. 3;

Fig. 5 is the other half of the half sectional view shown in Fig. 4 and taken through the line 4—4 of Fig. 3;

Fig. 6 is a transversal view taken on the plane 6—6 of Figs. 4 and 5;

Fig. 8 is a transversal view taken on the plane 8—8 of Figs. 4 and 5;

Fig. 9 is a partial elevational view longitudinal corresponding to Fig. 8;

Fig. 10 is a partial transversal view corresponding to Fig. 6;

Fig. 11 is an elevational longitudinal side view corresponding to Fig. 6;

Fig. 12 is a detail of Fig. 11;

Fig. 13 is a diagram illustrating the formation of the grinder profile made with the aid of a crusher free to travel axially;

Fig. 14 is a diagram illustrating the first cycle of cutting a file with submultiple pitch by means of an axially displaced full pitch grinder;

Fig. 15 is a diagram illustrating the second operation for cutting the same file with submultiple pitch.

Similar numerals refer to similar parts throughout the several views.

Figure 1:
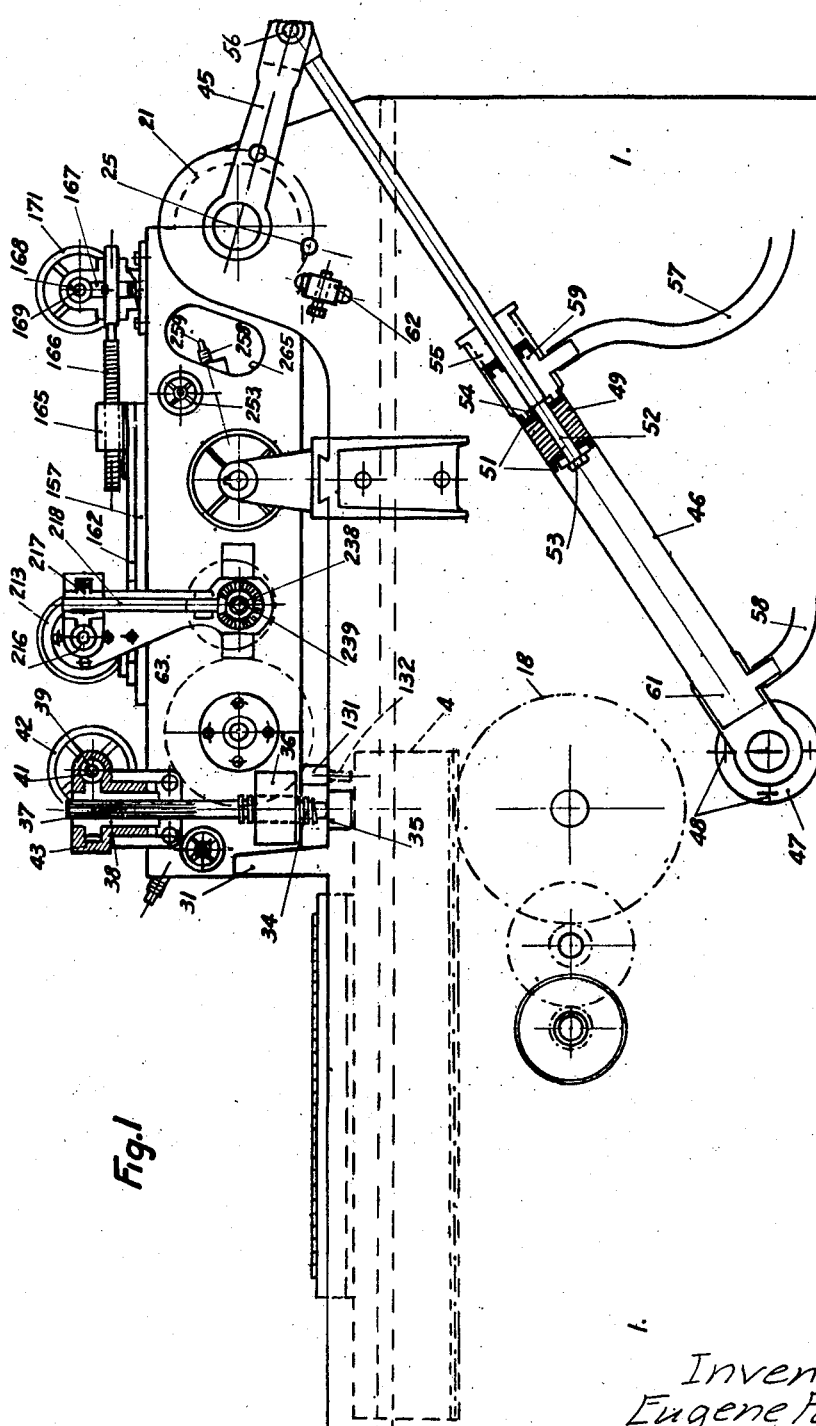
Fig. 1 is a longitudinal elevational view showing a machine for cutting files according to the present invention.

The machine has a framework 1 (Fig. 1) made of welded sheet metal or in any other suitable way: this framework is provided with slides 2 and 3 (Fig. 6) on which may slide the table 4 guided by guides 5 secured thereto by screws 6. Disposed on the table 4 is a magnetic plate 7 on which the files 8 to be cut are held by the magnetizing action of an electric current flowing through conductors 9 from two insulated bars 10, 11 and brushes 12, 13 mounted on a support 14 rigid with the table 4. The bars 10, 11 are made fast to the framework 1 by means of insulating blocks 15 traversed by bolts 16 connected with leads issuing from conductors passing through an insulating pipe 17. The table 4 is actuated by a rack-and-pinion mechanism 18—19. A reversible motor (not shown) actuates, through the medium of gears (not shown), the pinion 18 which, through the medium of the rack 19, causes the table 4 to reciprocate together with the magnetic plate 7 and files 8, while the brushes 12, 13 supply the electric current to the magnetic plate 7.

On the framework 1 there are mounted (Figs. 1, 4, 5) caps 21 and 22, supporting thrust ball bearings 23 and 24 (invisible in the drawings), in which is journaled a shaft 25 having a flange 26 made fast, by bolts 27, to the grinder supporting cage 28. Screw-threaded rings 29, screwed into the caps 21 and 22, serve to adjust the plays and the axial location of the cage 28 with respect to transversal abutments 31. It will be seen that the shaft 25 is further rendered axially rigid with the cage 28 by means of the sleeve 32, key 33 and bolts 30 affixing the sleeve 32 to the cage 28.

The cage 28, pivoting on the shaft 25, is adjustable in height by means of two screw-jacks 34 (Figs. 1 and 6) applying against abutments 35 rigid with the framework 1; the screws 34 pass through two nuts 36 rigid with the cage 28. These screws 34 are extended into suitably grooved rods 37 rotatable each by a worm wheel 38 controlled by a worm 39 set on a common shaft 41 rotatable by means of a hand wheel 42, the worm mechanisms being confined in housings 43 made rigid with the pivoting cage 28 by means of screws 44. The very simple operation of the jacks 34 obtains by turning the hand wheel 42; this rotates the two worms 39 and their wheels 38; this rotation displaces the grooved rods 37 rigid with the screws 34 which, by being screwed into the nuts 36, have their ends well applied against the abutments 35; in this way the upward or downward displacement of the pivoting cage 28 is positively assured.

Figure 2:
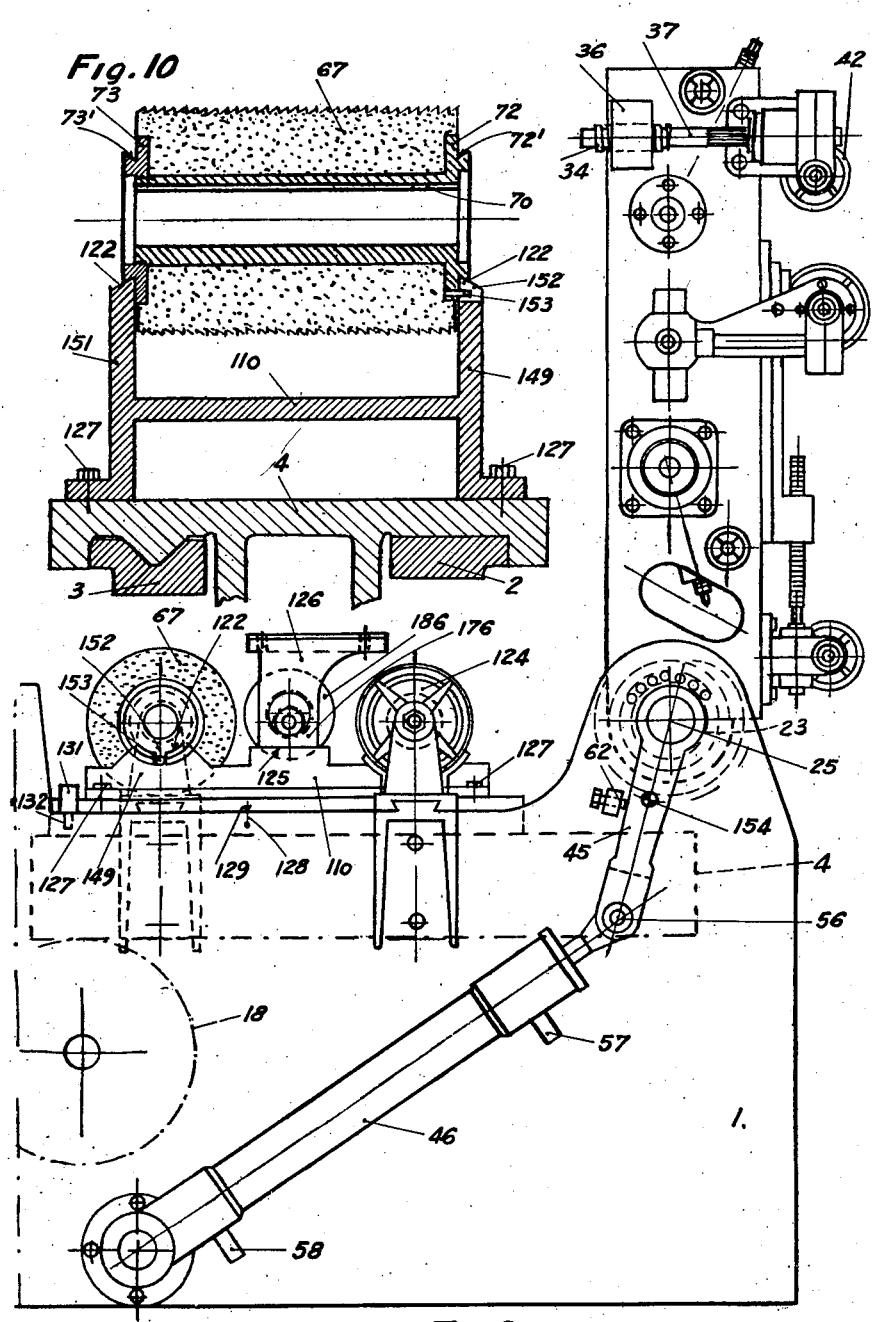
Fig. 2 is an elevational view showing the pivoting tool-frame in its raised position, while the tools removed from their axles rest on their cradle.
Figure 3:
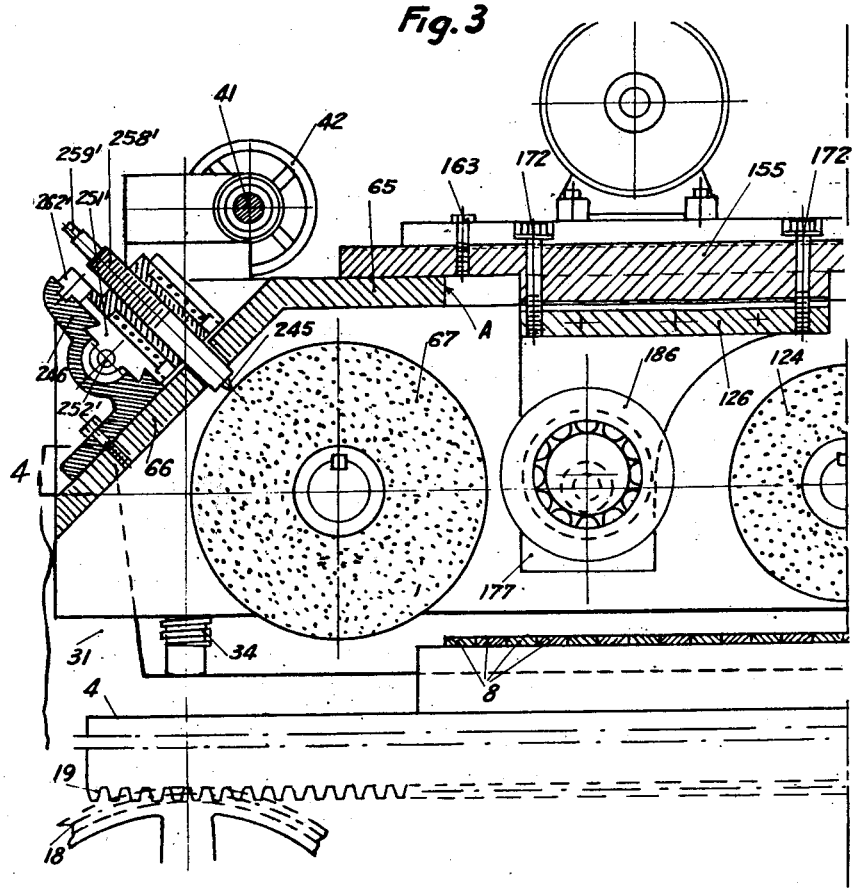
Fig. 3 is a partial longitudinal elevational sectional view taken through a longitudinal plane 3—3 perpendicular to the pivot of the tool-frame of Fig. 4.

Levers 45 (Fig. 1), rigidly connected with the ends of shaft 25, have their free ends connected respectively with the free ends of the piston rods of two hydraulic jacks placed on both sides of the framework 1. Each of these jacks has its cylinder 46 arranged to pivot in a fixture 47 made fast to the framework 1 by screws 48, and its piston 49 is constituted by leather packing 51 jammed on the piston rod end 52 between the nut 53 and the shoulder 54, the free end of the piston rod being pivotally connected, by means of an axle 56, with the free end of the lever 45. Each of these jacks is fed with drive fluid through two flexible pipes 57 and 58. When said fluid under pressure is sent through 57 into the chamber 59, the piston 49 is driven toward its lower end 61 and pulls down the lever 45, thereby raising the cage 28 and its parts to the position such as shown in Fig. 2. The displacement of the levers 45 is stopped by two abutments 62, and during this displacement the jacks will pivot in the fixture 47.

Of course, if the flow of fluid into the chamber 59 is restricted to a feeble leakage, it will be possible to send the fluid under pressure into the end 61; the downward displacement of the cage 28 will then be the slower, the lesser the leakage, because of incompressibility of the fluid. The cage 28, applied by its jacks 34 against the abutments 35, may be applied very strongly against the latter by the jacks 46, namely by increasing the leakage into the chamber 59, so that the cage 28 is integral with the framework 1 and can be displaced only when the hand wheel 42 is acted upon in the direction corresponding either to the downward or to the upward displacement of the cage 28.

Figure 7:
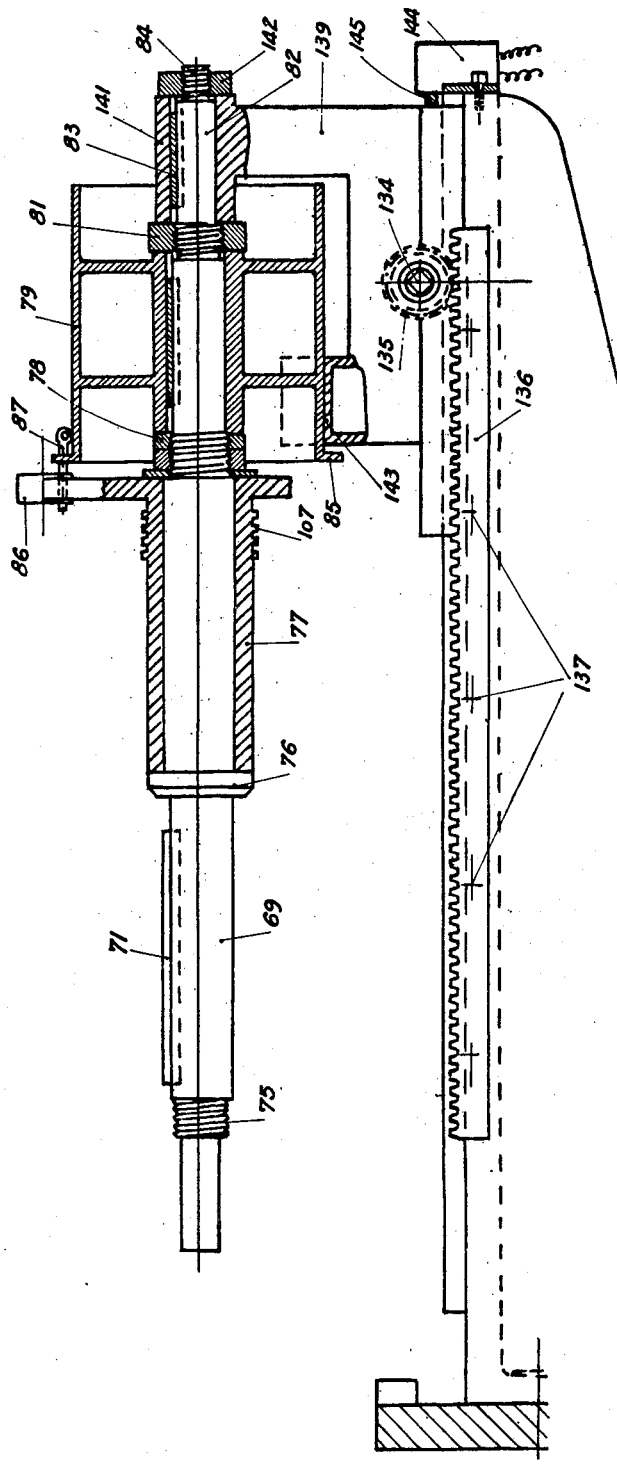
Fig. 7 is a partial transversal view corresponding to Fig. 6.

The cage 28 forms a very rigid ensemble comprising metallic walls 63, 64, 65, 66 between which there are conveniently arranged and maintained all the grinding elements and their controls. These elements include, particularly shown in Figs. 3, 4, 5 and 6, the cutting grinder 67 mounted on a hub 68 angularly keyed, by spline 71, onto the spindle 69. The hub 68 of grinder 67 jams the latter between a fixed cheek 72 and a screwed cheek 73. This hub is longitudinally blocked on the spindle 69 by the nut 74 screwed onto the threaded portion 75 of spindle 69, the hub 68 bearing against the shoulder 76 forming part of the spindle 69 passing through the threaded sleeve 77 (Fig. 7). The spindle 69 is axially stopped and adjusted in the sleeve 77, against play, by means of a washer, nut and counternut 78, while the hub of the drive pulley 79 is applied against said nuts by a threaded ring 81 screwed onto the spindle 69. The protruding journal 82 (Fig. 6) is provided with a key 83 and a threaded tail 84 terminating the spindle 69. It will be seen that the drive pulley 79 has a flange 85 preventing the drive belt (not shown) from slipping off the pulley. The second role of this flange is to permit a joint action of the pulley 79, and hence of the spindle 69, upon a lever 86 made rigid with the sleeve 77 by means of a pin 87 passing through two holes provided in the lever 86 and flange 85 (Figs. 6 and 7).

The sleeve 77 is screwed (Fig. 6) into the support 88 in which it is held without play by pistons 89 pushed by springs 91. An abutment washer 92 permits easy rotation of the sleeve 77 under the action of a jack, hydraulic for example, whose piston rod 94 is pivotally connected, by means of a common axle 95, with the lever 86 (Fig. 11). The support 88 is made rigid with the grinder carrying cage 28 by means of bolts 90 and a flange 96. In a flange 96' is hollowed out a T-like groove 97. This flange 96' has on its external face radial graduations 98 (Figs. 11 and 12) exactly corresponding to those made on the bottoms of displaceable abutments 99 and 101, blocked on the flange 96' by nuts 102, 103 cooperating with bolts 104 with square heads 105 displaceable in the groove 97, the graduated and marked portions of these abutments being in correspondence with the graduations 98.

The lever 86 has an index 106 whose angular displacements are limited by the abutments 99, 101 adjusted and immobilized in such a way that the location of the index 106 between the abutments 99 and 101, combined with the pitch of the thread 107 (Fig. 6), generally a predetermined axial displacement of the grinder 67, corresponding to a file pitch.

The end of spindle 69, opposed to the pulley 79, is journaled in the bearing 108 (Fig. 6) made rigid with the cage 28 by means of screws 109. This bearing 108 has two holes 111 adapted to receive the shanks of a U-shaped part 112 (Fig. 5). The shanks of this part 112 carry two rings 113 acted upon by springs 114 applied against a plate 115 limiting the travel of these cylindric rectilinear shanks 116, 117 of diameter greater than that of the portions, thereof receiving the springs 114. These cylindric portions are guided in housings provided to this end in the bearing 108 and terminated by portions of small diameters 118, 119 that may penetrate into holes 121 of the nut 74, thereby stopping the rotation of the corresponding grinder when the handle, formed by the curve of the U-shaped part 112, is pushed. By withdrawing the axle 95 and disconnecting the lever 86 from the piston rod 94, the jack 93 will be prevented from falling down by means of an abutment 100 affixed to the framework 1 (Fig. 11). It will then be possible, after placing the pin, 87 (Fig. 7), connecting the pulley 79 with the lever 86, to cause the latter to rotate about its axle, which will result in unscrewing the thread of sleeve 77, while the thread 75 (Fig. 6) of spindle 69 will be unscrewed from the nut 74 angularly immobilized by the shanks 116 and 117 (Fig. 5). The nut 74, which may move axially along the recessed shanks 118, 119 and remain suspended thereon, after complete dismantling, in a manner indicated by dotted lines in Fig. 5, will then be liberated from the spindle and held in place, ready to receive the same again, without trial.

The preparation for the extraction of the spindle and the setting in place of the latter are greatly facilitated by causing the spindle and its sleeve to rotate jointly with the aid of a pin or any other means which, acting upon the grinder nut, unscrews the same, while being then ready to be set in place.

The extraction of the spindle 69 necessitates, in view of the great weight of the parts, a grinder supporting cradle for carrying out the mounting or dismantling of the grinders or crushers. This cradle 110, such as is shown in Figs. 2 and 10, is made for example of steel, and should be very rigid and accurate in construction. It has circular chamfered gripping elements 122 fitted into sharp grooves 72', 73' coaxially arranged on the cheeks of the working grinder, and other similar parts 123 (Fig. 4) to receive the cheeks of the correcting grinder 124 (Figs. 3 and 5) fitted similarly, and two plane parts 125 (Fig. 2) intended to receive the bases 176, 177 of the crusher supporting structure 126 (Fig. 2). This cradle is rigidly attached to the table 4 by means of screws 127. An identifying mark 128, placed on the framework 1, indicates, when a mark 129 carried by the table 4 is set in coincidence with the mark 128, the exact correspondence of the axles of grinders 67, 124 and crusher support 126 with the parts to receive same. The cradle being placed on the table 4 pulled out of the grinder supporting cage, a hydraulic compressor (not shown) is set in operation, whereafter oil under pressure is sent into the pipe 57 to raise the cage 28 sufficiently high in order that the cradle 110 may be placed by being displaced on the table 4 without any part standing in the way. This height being reached, the valve (not shown) is closed and the jack is left charged under the influence of the weight of the cage 28, whereafter the table 4 is slowly set in motion, being stopped exactly when its mark 129 comes to face with mark 128. The operator then places, on each side of the framework 1, a vertical abutment 131 whose tail 132 penetrates into a hole 133 made in the framework 1 (Fig. 6). Meanwhile, the screw-jacks 34 will have been raised by operating the hand wheel 42 until their length projecting beyond the cage 28 will be inferior to that of the abutment 131, the valve controlling the fluid under pressure in the jacks 46 being slightly opened. Under the influence of the weight of the cage 28, acting upon the levers 45 and pistons 49, the chamber 59 is emptied and the cage 28 comes to rest against the abutments 131. The cage 28 is then in the position for extracting and replacing the grinders, the cycle of this operation being as follows: The assembly comprising the spindle 69, lever 86 and pulley 79 made rigid by the pin 87 is unscrewed from the sleeve support 88 and the nut 74 is released. The sleeve 77 is always centered in its support 88 and the end of spindle 69 is always engaged into the bearing 108. The operator then places a crank onto the square end 134 (Fig. 11) of the pinion 135 that may run on a rack 136 affixed by screws 137 to the flange 138 supporting the extractor 139 guided in a dovetailed slide 140. When the crank is turned in the convenient direction, the hub 141 (Fig. 7) will come to fit onto the end 82 protruding from the spindle 69 whose key 83 will have been correctly oriented to this end, until the hub will come to rest against the threaded ring 81. The nut 142 is then set in place and blocked. The extractor 139 is provided with a cylindric hollow part 143, coaxial with the pulley and of radius equal to that of this pulley, and comes to take position under the latter, so that even the considerable weight of the spindle cannot perceptibly lower the same. The spindle being thus fixed on the extractor, the operator turns its crank backwards, thereby extracting the spindle 69 and its parts out of the cage 28 and completely releasing the same from the supporting sleeve 88. To avoid any untimely operation, such for example as the setting in operation of the hydroelectric compressor feeding the jacks 46, there is provided an electrical contactor 144 set in operation when the rear of the extractor 139 applies against its push-button 145, thereby closing the circuit and permitting the setting in operation of the compressor.

The compressor circuit is also controlled by a similar switch operated by the extractor of the grinder 124 and that of the correcting crusher. The grinder 124 is mounted in the same way as the working grinder 67, the corresponding parts of the grinder 124 being designated by references such as 77', 78' and so on.

The various operations are also similar and, therefore, will not be described again, except for the control of the grinder 124, which is not effected automatically by a lever 86.

This lever 86 is replaced by a hand wheel 146 having vernier graduations 146' (Fig. 5) which the operator actuates by hand to displace the grinder 124 axially by rotating the threaded sleeve 77' whose play is automatically compensated by pistons and springs 89'. An index 147 permits an easy adjustment, while a screw brake 148 immobilizes the hand wheel with respect to the support 88'. Therefore, by loosening this brake 148 and then by employing, as previously, a U-shaped part 112', it is easy to extract the spindle 69', while the two grinders 67 and 124 will remain jammed between their cheeks of standard dimensions, beveled and received into the corresponding gripping elements of the cradle, the grinder 67 for example into the gripping parts 149 and 151 (Fig. 10). The gripping parts 149 have a radial cutaway 152 into which is fitted a pin 153 carried by the fixed cheek 72 of the grinder, so as to secure the orientation of the spline 70, the key 71 being oriented by the key 83 (Fig. 7) placed into the hub 141 of the extractor, so that the introduction of the spindle 69 is effected without trial in reassembling.

The various operations of extraction of the hubs being carried out and the contactors 144 and 144' in series being closed, the operator may raise the cage 28 by sending, as previously, the fluid under pressure through the pipe 57 into the chamber 59; the piston 49 will move downwards and raise the cage 28 with the aid of the lever 45 and shaft 25; when arrived at the abutment 62, it may be immobilized merely by the pressure of the fluid, or it may be locked by a pin 154 (Fig. 2) passing through the lever 45 and penetrating into a hole made in the framework 1. The grinder may then be withdrawn, for example by means of a hoist, to be replaced.

The crusher support 126 is detachable in the same conditions and with the same cradle. The parts to be actuated for carrying out this operation will be indicated later. The grinder or the ensemble of dismantled parts, placed on the cradle, may also be withdrawn by means of a hoist with the cradle.

In the arrangement according to the invention the crusher, intended for grooving the working grinders and for their maintenance, operates in a special manner and is, in the course of grooving or rectifying the working grinder, not only freely rotatable about its axle, but also movable along the latter. In contrast, this crusher will be keyed on its axle, against rotation and translation, in the course of operations effected thereon by the maintenance grinder.

The crusher will also be mounted on an axle that may itself rotate excentrically on a fixed axle to contact either the working grinder or the rectifying grinder. This crusher is further rotatable irreversibly by means of an electric motor, despite its variable positions.

Like the grinders, this crusher is supported on its axle between two bearings carried by the cage 28, while being demountable with the aid of means analogous to those hereinabove and described hereinafter.

The crusher carrier and its control parts are shown in Figs. 3, 4, 5 and 8. The grinder supporting cage 28 has on its top an opening (A—B of Fig. 3, and C—D—E—F of Figs. 4, 5) in which there is arranged a support 155 slidable dovetail fashion between guides 156, 157 affixed to the cage 28 by means of screws 158, 159; a wedge 161 takes care of eventual plays. A plate 162 is rigidly affixed to the support 155 by means of screws 163, 164. A nut 165 rigid with the plate 162 receives a screw 166 (Figs. 1, 3) rigidly connected with a worm wheel 167 actuated by a worm 168 mounted on an axle 169 rotatable by a hand wheel 171. The parts 168, 167 and 166 are confined in a housing 180 affixed to the top 65 of the cage 28. The rotation of the hand wheel 171 in one or the other direction moves forth or back the plate 162 affixed to the slidable dovetailed support 155 under which the crusher carrier 126 is locked by means of externally detachable bolts 172, 173. A longitudinal prismatic groove 174 in the support 155 receives a corresponding guide-prism 175 protruding from the crusher carrier 126 and being perpendicular to the crusher axis, in a manner to be suitably oriented with respect to the general axis of the machine and to assure the parallelism of the crusher axis with the axes of the grinders. The inverted U-shaped crusher carrier 126 has two branches 176, 177 in which are fixedly mounted two flanged bearings 178, 179. The bearing 178 receives a castellated sleeve 181 provided with a split ring 182 and a shoulder 183 limiting its play to allowable amounts, while an externally toothed pinion 184 is cut in the sleeve 181. This pinion is in mesh with an internally toothed crown 185 arranged without play within the crusher 186. This crusher is axially bored with two cavities 187 comprising two races of balls 188. The crusher 186 engages, on one hand, against the shoulder 189 and, on the other hand, against the adjustment nut 191, so that it may rotate without play. The rolling axle 192 has two mandrels 193, 194 equally excentered. The mandrel 194 rotates freely in the sleeve 181, while the mandrel 193 has a castellated crown 195 in mesh with a corresponding crown 196 rigid with the sleeve 197, the axial displacements of which are limited by the split ring 198. A lever 199, having its free end parallelly slidable on a screw-threaded button-ended rod 201, is keyed onto the sleeve 197 and blocked axially by the nut 202. A plate 203 is rigidly affixed, on one hand, to the plate 162 and, on the other hand, to the part 204, by means of screws 205. The button-ended rod 201 may be unscrewed and then screwed into the threaded hole 206 (Fig.

8), thereby causing the excentered axle 192 of crusher 186 to make a half-revolution. To this effect, the button-ended rod 201 is unscrewed and the lever 199 is pulled to disengage the castellations 195 and 196; it is then possible to change the orientation of the excentricity of the crusher 186. Finally, if the thumb nut 207 is blocked, it is stopped against the sleeve 197, pulls the axle 208 and assures the blocking of the face 209 of the eccentric axle 192 against the bearing 179, so as to thereby nullify all axial plays of the crusher 186.

The latter may be set in rotation by means of the mechanism confined in the housing 211 (Fig. 8) affixed to the supporting plate 162 by screws 212, while the drive motor 213 is affixed to the same supporting plate 162 by means of screws 214. A coupling 215, keyed onto the motor shaft and onto the axle of the worm 216, assures the irreversible drive of the worm wheel 217 keyed onto the shaft 218 carrying on its lower end, integral with it, a bevel pinion 219. This pinion 219 drives a bevel pinion 222 carrying a grooved collar 223 that rotates the sleeve 224 by means of a key 225 fitted to slide in a groove of the sleeve 224. The latter is axially displaceable by means of the following mechanism (Figs. 8, 9): a ball lever 226 keyed onto an axle 227 is journaled in a support 228 rigid with the housing 211. The axle 227 is rigid with a fork 229 provided with diametrally opposed dogs 231 acting in a grooved collar 232 made rigid with the sleeve 224 by means of a shouldering and a nut 233. A sector 234, integral with the support 228, is provided with holes 235 in one of which there may be placed a pin immobilizing the lever 226 in a predetermined position, for example that shown in the drawing. In this position, the castellations 236, cut at the end of the sleeve 224, are in mesh with the castellations of 181. The motor 213 then drives, through the transmission just described including the bearing 237, the sleeve 224 and, with it, the gears 184—185, thereby rotating the crusher 186. The reactions due to the rotation of the crusher are supported and balanced by the castellations 195—196 and the leverage 199—201. Of course, should the crusher 186 rotate freely on its ball bearings 188, the ball lever 226 will be raised after the pin has been removed and placed again into one of the corresponding holes 235 in the sector 234; this permits the fork 229 to move outward the rotating sleeve 224 sliding within the grooved collar 223 of beveled pinion 222 axially engaging against a corresponding seat provided in the housing 211. The castellation 236 is thus disengaged from that of the sleeve 181, whereby the latter is rendered free, while the crusher 186 is liberated and may be rotated by mere friction against the desired grinder.

The dismantling or setting in place of the crusher carrier in the grinder carrying cage 28 is as follows: The crusher-assembly being in the position shown in Fig. 8 and the cage 28, table 4, cradle 110 being in their dismantling positions, the bases 176—177 of crusher carrier 126 find themselves placed exactly upon the faces 125 of cradle 110 (Fig. 2); the operator then unscrews the bolts 172—173, thereby releasing the crusher carrier 126 from its slidable support 155. Thereafter he sets the lever 226 in its position of disengagement, whereupon he unscrews the axle 239, by applying his wrench onto the square end 239 thereof, and completely withdraws the same. Then, by acting similarly upon the square end 208', he unscrews and withdraws the axle 208, while the lever 199 has its rod 201 unscrewed from the plate 203 and is, together with the sleeve 197, moved outwards so as to disengage the battlements 195 and 196. The crusher carrier is thus completely liberated and, when the cage 28 will be raised, it will remain upon the cradle from which it may be hoisted by the operator at his will.

The dismantling of the crusher is very simple: the U-shaped support 126 has two parts assembled together by means of screws 240 which, when unscrewed, permit of extracting the crusher 186 and its excentered axle 192; the crown 185 is removed; the nut 191 is unscrewed; the axle 192 is extracted and the balls 188 fall down. A new crusher may then be mounted in the reversed way.

The diamonding of the two grinders is implemented by two diamonds which operate in a manner known per se, but with the aid of particular means designed according to the present invention.

The grinder supporting structure of the machine permits not only the setting in operation of the working grinder and its maintenance and the maintenance of the crusher, but also all the operations concerning the formation of crushers: the grooving of grinders and the rectification of grinders and crushers are carried out, with great accuracy, on the machine itself by means of one or several primary or prototype crushers.

To this end, the machine is provided with two devices for displacing the diamonds, intended for cutting the working and maintenance grinders, when these are mounted on their spindles, as well as several spare crushers, so as to thereby assure, for unlimited production, constant shapes of files under treatment. As the two diamonding devices are substantially similar in construction and operation, only one of them will be described in detail, numerals referring to similar parts being indexed in the other.

The machine has two diamonds 244 and 245 (Figs. 3, 4, 5), of which only the respective supporting parts 247 and 246 are different.

The description will involve, by way of example, mainly the diamond 244 intended for machining the maintenance grinder 124.

The support 247 is rigidly affixed to the underside of the plate 65 of the grinder carrying cage, by means of screws 248. This support is inclined in a manner to cause the axis of the holder of the diamond 244 to pass through the axis of the grinder 124 to be shaped. To simplify the drawing, this ensemble is shown (Figs. 4 and 5) as having its axis of displacement parallel to the plane 4—4 of the grinder carrying cage 28, but it may be inclined thereto. The support 247 has a female dovetail 249 in which travels a carriage 251 which may be displaced transversely under the action of a screw 252 actuated by a detachable hand wheel 253. A bearing 254 has a threaded ring 255 acted upon by a spring 256 applied against the shoulder of a sliding sleeve 257 into which is screwed the diamond holder 258 that may be adjusted by applying a wrench onto its square end 259. The sliding sleeve 257 has an appendage 261 held in contact with a pattern 262 affixed to the support 247 by screws (not shown). Two openings 264, 265 (Figs. 2 and 3) for the operator's hands are provided in the walls of the grinder cage; they permit of advancing the diamond 244 by rotating the square end 259 accessible through said openings. If the grinder 124 (or 67) is in rotation and the diamond 244

(or 245) adjusted, it will suffice to rotate the hand wheel 253 (Fig. 5) in order that the carriage 251, acted upon by the screw 252, may reach the other end of the support 247; during this travel the appendage 261, following the reproducer 262, will faithfully displace the diamond 244 that will have attacked the grinder 124 or 67 and cut the same to the desired form generated by the form of the reproducer 262. The operator will move the diamond 244 towards the grinder axis by acting upon the square end 259, thereby advancing the threaded diamond-holder 258 toward the grinder. A second cut will take place and, under the combined action of the spring 256 of appendage 261 and the reproducer 262, will impart to the grinder the desired final form. It will be understood that there may be made as many cuts as necessary and that the two reproducers 262, 262' are identical with each other, so that the two grinders 67 and 124 are also identical with each other. It remains now to rectify externally the crusher 186 to the form of the grinders. To this end, the lever 199 (Fig. 8) is oriented onto one of the holes placing the axle 190 of rotation of the crusher in close proximity to the correcting grinder 124, for example, whereafter the castellations 195—196 are set in engagement and the rod 201 is screwed into the plate 203, while the nut 207 axially blocks the face 209 of the excentered axle 192 against the inner face of the bearing 179. All axial play of the crusher 186 is thus eliminated; the castellations of 181 and 236 are set in engagement through the lever 226. The motor 213 is then set in operation and sets in rotation the crusher 186 by means of the mechanism confined in the housing 211 and by means of the gears 184—185. The grinder 124 is set in rotation by means of a belt and motor (not shown). The operator then moves the crusher 186 slowly toward the grinder 124, by rotating the hand wheel 171 that drives the screw 166 through the worm gear 167—168. The nut 165, urged by the screw 166, displaces together with 162 the support 155 on which the crusher carrying assembly is mounted; the crusher, previously rough-machined and hardened, will be rapidly rectified by the grinder 124. It is to be noted that the latter may, if necessary, be retouched in course of work by the diamond 244.

The crusher is then dismantled as above indicated, whereafter the circular grooves 200 are cut all around to the profile required for cutting the files with the pitch selected as unit on a known special machine. This "primary or prototype" crusher 186 is then reassembled, so termed because it permits of making other crushers with submultiple pitch.

The crushing operation of a grinder, 67 for example, is carried out as follows: First, the motor belt (not shown) is removed; then, the crusher axle 192 is left axially blocked by the nut 207, while the lever 226 is left in the position in which the crusher is driven by the motor 213. The operator rotates the hand wheel 171 which, through the screw 166 and its parts, sets the crusher in contact with the grinder 67. The latter is thus rotated, while the tips of the circular teeth 200 of the crusher 186 bite off abrasive grains and penetrate exactly into the grinder. When the latter is dug out a few tenths of a millimeter, the operator loosens the nut 207 so that the crusher may be free axially and bite into the grinder in the direction H (Fig. 13) which is the direction resulting from the pressure generated by the crusher 186 against the grinder; in this way, the crusher bites off the grains situated on the vertical faces O—O with the same efficacy as those situated at R. It is to be noted that, if during this work the crusher were maintained axially fixed as it was at the starting, it would rapidly wear away by its friction against the rectified tooth faces O—O. When the first grinder, 67, is cut, the operator moves the crusher away from the grinder and, with the aid of the lever 199, tips through 180° the excentered axle 192 of crusher 186 so as to position the latter close to the grinder 124, whereafter he will rotate the hand wheel 171 in the opposite direction, to attack the grinder 124 which will then be grooved, like the first one, with the same precautions (crushers first blocked and then rendered axially free).

From the economical viewpoint, the grinder 124 should be grooved in the first place, because it is intended for cutting and upkeeping the crushers; therefore, as soon as it is cut, it is of advantage to dismantle the crusher 186 and replace it by another crusher unused but already rectified externally to the smooth form as hereinabove. The latter is axially immobilized through the nut 207, while being rotated by the motor 213 and its associate parts. The pulley 79' (Fig. 5) receives its belt (not shown) and its motor (not shown) is set in rotation; the spindle 69' rotates the grinder 124 which attacks the crusher 186, when the operator rotates the hand wheel 171; when cut, the crusher is moved away from the grinder 124 and is ready to assure its service on the grinder 67. It is to be noted that when this crusher 186 has its profile deteriorated, the latter immediately may be made up like new by the grinder 124 whose threaded sleeve 77' assures the axial displacement necessary for economically retouching the circular teeth; to this end, the operator moves, on one hand, the crusher toward the grinder in the direction of the arrow M (Fig. 5) and, on the other hand, the grinder in the direction of the arrow N, thereby rapidly retouching the deteriorated vertical faces O—O (Fig. 13). The operation may be controlled by means of reading, ahead of an index 147, the vernier 146' engraved on the hand wheel 146 and which makes it possible, among other operations, to cut a crusher having a submultiple pitch of the primary or prototype crusher. Let a crusher be cut for example to four-millimeter pitch that will have been imparted thereto by the grinder 124 having the same pitch. By placing an unused crusher onto the miller carrier, the operator sets in operation both grinder and crusher and attacks the latter up to half-depth of the teeth (Fig. 14). At this instant, he moves the crusher 186 away from the grinder 124, whereafter by acting upon the hand wheel 146 he causes the grinder 124 to move forth a half-pitch, and resets in operation the hand wheel 171 in a manner to dig up a second series of teeth such as shown in Fig. 15. This example clearly illustrates the possibilities of the machine.

The machine thus described, together with its operational parts, is therefore ready for cutting files. The latter, 8, are arranged upon the magnetic plate 7 movable, as above described, under the grinder 67. The drive belt of this grinder being put on, the operator sets in operation the table 4 with the aid of a motor (not shown). He will previously have removed the abutments 131; while the files will travel forth and back owing to a current reverser (not shown) acting upon the motor and being controlled at each end of stroke of the table, he will rotate the hand wheel 42 controlling the screw-jacks 34, so as to cause the grinder to move down onto the files and form thereon the corresponding teeth. At each end of stroke, the jack 93 will receive a fluid under pressure sent thereinto by a compressor unit provided with a reversible valve of known type controlled by the reciprocations of the table and feeding the fluid into one or the other of the pipe connections 93a, 93b of said jack 93 whose piston rod 94, pivotally connected to the lever 86, causes the threaded sleeve 77 to rotate through an angle corresponding to that formed by two lateral faces of abutments 99, 101 between which there is interposed the key 106 limiting the stroke imposed by the jack 93, this limiting being, for this case, to a half pitch of that of the grinder which, at every stroke, alters the tooth, whereby there are assured the cutting and sharpening of submultiple pitches of the grinder, which may be varied, if so desired, by displacing the abutments 99, 101 over the corresponding graduations (Figs. 4 and 12). The files 8, thus subjected to the action of the grinder 67, have their first faces rapidly cut; the machine is then stopped, the files are turned over and their second faces ground in turn.

What is claimed is:

1. A machine of the character described for cutting files by grinding with peripherally-grooved tools, comprising, in combination, a machine frame, a cage pivotally-mounted on a shaft journalled in said frame, a housing slidably mounted in said cage, a crushable file grinder, a crusher for cutting and maintaining said crushable file grinder, and a second grinder for maintaining and rectifying said crusher, said grinders having axles and being removably mounted in parallel spaced relationship in said cage, said crusher having an axle and being removably mounted in said housing between said grinders with its axle parallel to the axles of said grinders, said grinders and said crusher being parallel to said shaft and the axial length of said grinder and said crusher being sufficient for grinding simultaneously the entire length of the files, means connected to said cage for adjusting the position of said cage relative to said frame, means connected to said housing for slidably displacing said housing in said cage, a files-supporting carriage mounted for horizontal slidable movement in said frame beneath said cage, means connected to said carriage and for sliding said carriage, and means connectable to said crusher and said grinders for effecting rotation thereof.

2. A machine as defined in claim 1, further comprising means connected to said file grinder for automatically displacing the file grinder along its axis to cut the files to a pitch which is a submultiple of its own pitch and to sharpen the teeth previously cut on the files.

3. A machine as defined in claim 1, further comprising means connected to said file grinder for axially displacing the second grinder along its axis when the crusher is pressed against said second grinder to rectify its surface.

4. A machine as defined in claim 1, wherein the crusher is free to rotate on its axis and to move simultaneously by translation along its axis.

5. A machine as defined in claim 1, further comprising means supporting a diamond adjacent said grinders for cutting the surface of each grinder, and two pattern means positioned to engage said means supporting the diamonds for controlling the said cutting by the diamond on each grinder, both pattern means being identical.

6. A machine as defined in claim 1, wherein the crusher is positioned on an eccentric axle and the housing is slidably displaceable in a direction perpendicular to the axes of the grinders.

7. A machine as defined in claim 1, further comprising a cradle rigidly secured in fixed position on the files-supporting carriage and being adapted to receive one or the other of the grinders, means mounted on said machine frame arranged to engage, to reengage and to support said axles laterally, and means mounted on said cradle for replacing one grinder with another grinder.

8. A machine as defined in claim 1, further comprising a cradle rigidly secured in fixed position on the files-supporting carriage and adapted to receive the crusher housing, the housing and the crusher being adapted to be moved away from the cage supporting the grinders to permit one crusher to be replaced by another crusher.

EUGÈNE FOUQUET.

REFERENCES CITED

The following references are of record in the file of this patent:

UNITED STATES PATENTS

| Number | Name | Date |
|---|---|---|
| 1,015,567 | Landis | Jan. 23, 1912 |
| 1,026,321 | Hodny | May 14, 1912 |
| 1,619,361 | Moyer | Mar. 1, 1927 |
| 2,456,762 | Wilson | Dec. 21, 1948 |

FOREIGN PATENTS

| Number | Country | Date |
|---|---|---|
| 526,938 | France | July 15, 1921 |

OTHER REFERENCES

Ser. No. 420,312, Fouquet (A. P. C.), published June 15, 1948.